United States Patent [19]

Nagayama

[11] Patent Number: 4,608,353

[45] Date of Patent: Aug. 26, 1986

[54] HIGH-ALUMINA REFRACTORY FOR USE IN NON-FERROUS METAL MELTING FURNACE

[75] Inventor: Hiroshi Nagayama, Katsuta, Japan

[73] Assignee: Hitachi, Ltd., Tokyo, Japan

[21] Appl. No.: 603,670

[22] Filed: Apr. 25, 1984

[51] Int. Cl.⁴ .................. C04B 35/10; C04B 35/58
[52] U.S. Cl. ................................. 501/97; 501/98; 501/128
[58] Field of Search ................. 501/97, 98, 128

[56] References Cited

U.S. PATENT DOCUMENTS 4,218,254  8/1980  Kiehl et al. ..................... 501/97

FOREIGN PATENT DOCUMENTS 0032112  4/1973  Japan ......................... 501/97
1469768  4/1977  United Kingdom ............ 501/97

Primary Examiner—Howard S. Williams
Attorney, Agent, or Firm—Antonelli, Terry & Wands

[57] ABSTRACT

A refractory for use in a non-ferrous metal melting furnace, comprising a mixture of high-alumina aggregate particles containing at least 60% by weight of aluminum oxide and silicon nitride particles, admixed with particles of a solid substance; e.g., graphite, which generates carbon monoxide by reaction with the melt of said non-ferrous metals. This refractory has an advantage of being highly difficult to be corroded by slag formed during melting of said non-ferrous metal.

11 Claims, 8 Drawing Figures

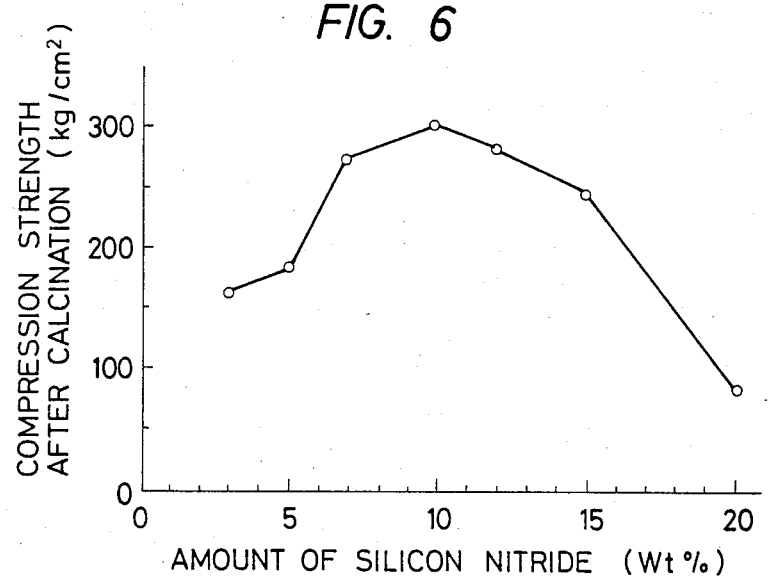
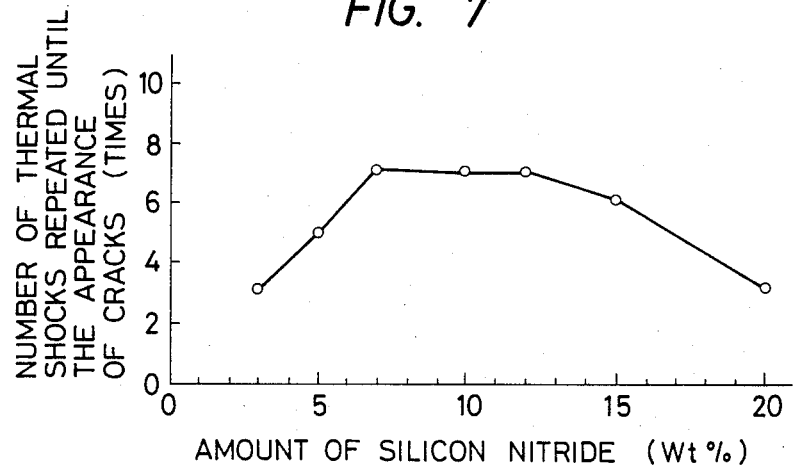

HIGH-ALUMINA REFRACTORY FOR USE IN NON-FERROUS METAL MELTING FURNACE

BACKGROUND OF THE INVENTION

1. Field of the Invention

The present invention relates to a high-alumina refractory for use in a furnace for melting non-ferrous metals having a melting point not higher than 1200° C., more particularly to a refractory suitable for use in a furnace for melting copper alloys.

2. Description of the Prior Art

High-alumina refractory is used for example as inner lining in a furnace for melting copper, brass, zinc, aluminum, or other non-ferrous metals. This high-alumina refractory comprises particles of high-alumina aggregate, in which aluminum oxide accounts for at least 60% by weight, the balance being substantially silicon dioxide, and a binding agent.

This high-alumina refractory, however, has disadvantages of being poor in resistance to thermal shock and forming a reaction product in contact with an aluminum melt. Because of the poor resistance to thermal shock, the inside of a copper- or copper alloy-melting furnace in which said refractory is applied is susceptible to cracks when the furnace is cooled. When the furnace is again used for melting copper or copper alloys, the melt penetrates into the furnace walls through these cracks, which causes peeling of the inside wall portions in which the melt has penetrated on account of the difference in the thermal expansion coefficient between the portions in which the melt has penetrated and those in which it has not penetrated when the furnace is cooled. There is a danger of coil shortcircuiting accidents caused by the penetration of the copper melt in an induction melting furnace.

When aluminum or aluminum alloys are molten in a furnace wherein said refractory is applied, the melt reacts with the refractory to form a reaction product, which adheres to the furnace walls resulting in the decrease in the internal area of the furnace. Moreover, some of the components of the aluminum alloy melt causes part of the reaction product to penetrate into the inside of the furnace, thus bringing about the peeling of the walls.

The present inventor has previously discovered that the resistance to thermal shock of the high-alumina refractory can be improved and the reaction with aluminum melt can be prevented by incorporating silicon nitride in the refractory (see, for example, Jap. Laying-open No. 56-22675).

SUMMARY OF THE INVENTION

OBJECT OF THE INVENTION

An object of the present invention is to provide a refractory having higher resistance than the above-mentioned high-alumina refractory containing silicon nitride against corrosion by the slag formed when copper alloys are molten.

STATEMENT OF THE INVENTION

The present invention is characterized by incorporating particles of a solid substance which generates carbon monooxide by reacting with non-ferrous metal melts in a refractory comprising a mixture of high-alumina aggregate particles and silicon nitride particles, or a mixture further containing a binding agent.

The refractory of the present invention has remarkably longer life than the previously developed refractory for use in a furnace for melting copper-zirconium, copper-zirconium-phosphorus, or other copper-zirconium alloys.

The refractory of the present invention, like the previously developed silicon nitride-containing refractory, is resistant to thermal shock, and moreover it does not react with an aluminum alloy melt to form a reaction product.

The present inventor has arrived at the finding, during the work of melting several types of copper alloys in a melting furnace made of a refractory comprising a mixture of high-alumina aggregate particles and silicon nitride particles, that when copper-zirconium, copper-zirconium-phosphorus, or other copper-zirconium alloys are molten in the furnace, the furnace walls are corroded by the slag on the surface of the melt so that the refractory in the vicinity of the slag is molten and destroyed, because of the presence of a low-melting substance molten into the slag. This low-melting substance was found to be a reaction product of the slag generated from the molten copper-zirconium alloy, principally comprising CuO, with mainly silicon dioxide of the refractory.

It is necessary, therefore, to prevent the silicon nitride-containing high-alumina refractory from being corroded by the slag principally comprising CuO. The refractory of the present invention has thus been invented.

If a solid generating carbon monoxide by reacting with non-ferrous metal melts, for example graphite, is incorporated in a refractory containing high-alumina aggregate and silicon nitride, the following phenomena are found, which results in the decrease in the amount of CuO in the slag, thereby reducing the corrosion of the refractory by the slag.

(i) The CuO in the slag and in the melt is partly reduced by graphite contained in the refractory according to the following reaction (1):

$$CuO + C \rightarrow Cu + CO \qquad (1)$$

(ii) CO which was generated by the oxidation of the graphite in the refractory reduces part of the CuO remaining in the slag and in the melt according to the following reaction (2):

$$CuO + CO \rightarrow Cu + CO_2 \qquad (2)$$

(iii) The CO generated by the oxidation of the graphite forms a gaseous film comprising CO or $CO_2$ on the surface of the refractory walls, preventing the wetting of the refractory with the melt.

BRIEF DESCRIPTION OF THE DRAWINGS

FIG. 6 is a graphical representation of the relationship between the amount of silicon nitride and compression strength;

FIG. 7 is a graphical representation of the relationship between the amount of silicon nitride and the number of thermal shocks repeated in a thermal shock test until cracks appears;

The refractory of the present invention will be more readily understood by the following description of the components thereof.

(a) Alumina aggregate

The aggregate used in the present invention preferably contains at least 60% by weight of aluminum oxide. The aliuminum oxide aggregate can be contained at an amount of 48 to 97% by weight based on the total weight of the refractory composition. As the amount of aluminum oxide in the aggregate is increased, the amount of silicon nitride is decreased, which results in the decrease in the amount of the reaction product of the slag principally comprising CuO and the refractory, thereby reducing the corrosion of the refractory.

Figure 1:
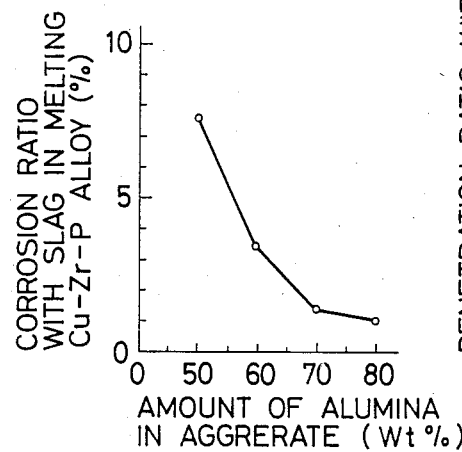
FIG. 1 is a graphical representation of the relationship between the amount of aluminum oxide contained in high-alumina aggregate and corrosion ratio.

FIG. 1 is a graphical representation of changes in the ratio of corrosion of the refractory by the slag principally comprising CuO with the amount of aluminum oxide contained in high-alumina aggregate. As clearly understood from the figure, the corrosion ratio is decreased as the amount of aluminum oxide in the aggregate is increased. The preferable amount of aluminum oxide in the aggregate is at least 70% by weight. A refractory comprising 12% by weight of silicon nitride, 5% by weight of graphite, 10% by weight of clay, and the balance of high-alumina aggregate was used in the experiment. The high-alumina aggregate comprised coarse grains ranging from 4.7 to 1.2 mm, medium grains ranging from 1.2 to 0.15 mm, and fine grains small than 0.15 mm, in which about 60% by weight of the total amount of the aggregate was coarse grains and about 25% by weight was medium grains.

The refractory was molded into a cylindrical crucible having an external diameter of 50 mm $\phi$, a height of 50 mm, and a central hole of 20 mm $\phi$ in diameter and 30 mm in height. The obtained crucible was charged into a graphite crucible, sealed on the periphery so as not to be affected by atmospheric air, and fired at 1200° C.

A copper-zirconium(0.01% by weight)-phosphorus (0.01% by weight) alloy was molten in this refractory crucible and maintained for 2 hours. After being freed of the melt, the refractory was vertically cut into half to determine the ratio of corrosion with the slag according to the following formula. The corrosion ratios referred to in the descriptions below were all determined in the same manner wherein the "area of the hole" refers to the area taken on the vertical cutting plane.

Corrosion ratio (%) =

$$\frac{\text{(Cross-sectional area of the hold enlarged by the corrosion)} - \text{(Cross-sectional area of the original hole)}}{\text{(Cross-sectional area of the original hole)}} \times 100$$

High-alumina aggregate can be prepared by an electromelting process or a firing process. The aggregates prepared by the firing process are superior to those prepared by the electromelting process in the resistance to thermal shock and sinterability. On the other hand, the aggregates prepared by the electromelting process are superior to those prepared by the firing process in the resistance to corrosion by the slag principally comprising CuO. It is, therefore, preferred to preare the aggregate by a combination of these two processes.

Mullite, or corundum is an aggregate containing 70% by weight of aluminum oxide. When chamotte having a less aluminum oxide content is used, it is preferably mixed with corundum or mullite so that the aluminum oxide content of the obtained aggregate is at least 60% by weight. The final content of aluminum oxide in the refractory composition should be about 30 to 90% by weight.

The resistance to thermal shock, strength, or penetration or corrosion by the melt of the refractory are dependent on the particle size distribution of the high-alumina aggregate. It is preferred that the high-alumina aggregate comprises coarse grains having a particle diameter of at least 1.2 mm, medium grains having a particle diameter ranging from 1.2 to 0.15 mm, and fine grains having a particle diameter smaller than 0.15 mm. The coarse grains are necessary for increasing the strength, e.g., compression strength, and also the resistance to thermal shock of the refractory. However, if the aggregate comprises coarse grains only, the obtained refractory has many voids and unsatisfactory in density and strength. Such a refractory is liable to be physically damaged by the penetration of the melt. The refractory is structurally reinforced and endowed with higher strength to be prevented from penetration and corrosion by the melt by the addition of the fine grains. However, refractory comprising coarse and fine grains only is not yet satisfactory in the resistance to thermal shock and corrosion. These disadvantages are overcome by incorporating medium grains. The proportions of the coarse, medium, and fine grains in high-alumina aggregate are preferably 40 to 70% by weight of coarse grains, 10 to 30% by weight of medium grains, and 10 to 40% by weight of fine grains. The particle diameters of the coarse grains are preferably not larger than 4.7 mm.

(b) Silicon nitride

Incorporation of silicon nitride increases the resistance of the refractory to thermal shock, which prevents the cracking when the furnace is cooled. Moreover, it prevents the reaction of aluminum or aluminum alloy melt with the refractory.

A preferable silicon nitride is $Si_3N_4$.

The particle size of the silicon nitride is preferably as small as possible, desirably smaller than 0.15 mm in particle diameter, to obtain a dense refractory having little voids. It is preferred that the maximum particle diameter of the silicon nitride is smaller than 1.2 mm and at least 80% by weight of the total amount of the silicon nitride is in the form of particles that are smaller than 0.15 mm in particle diameter.

FIGS. 2 to 7 are graphical representations of changes in the penetration ratio of melt, ratio of corrosion of a refractory by slag, and compression strength and thermal shock resistance of the refractory with the amount of silicon nitride contained in the refractory.

The refractory comprises high-alumina aggregate, silicon nitride, graphite, and clay. The amount of the clay was fixed at 10% by weight, while the amount of graphite was varied as 3, 5, and 10% by weight. The high-alumina aggregate comprised about 60% by weight of coarse grains, about 25% by weight of medium grains, and the balance of fine grains. The silicon nitride was finely divided particles of $Si_3N_4$ having a particle diameter smaller than 0.15 mm. The melt component was copper-zirconium(0.01% by weight)-phosphorus(0.01% by weight) alloy.

The penetration ratio of the melt was determined by vertically cutting the crucible, measuring the crosssectional area of the layer, taken along the vertical cutting plane, around the hole of the crusible into which the melt and the slag had penetrated, and dividing the obtained value of the crosssectional area by the original crosssectional area of the crucible hole. All of the penetration ratios were determined in the same manner.

Figure 2:
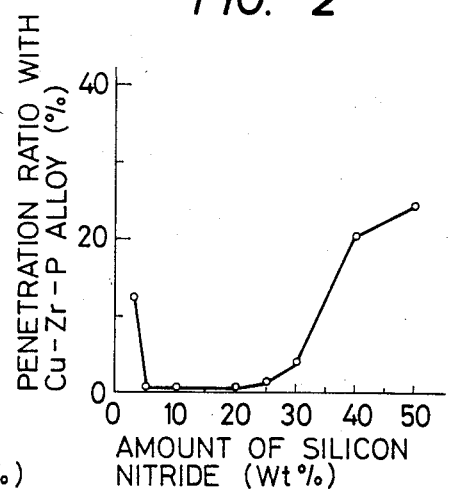
FIGS. 2 and 3 are graphical representations of the relationship between the amount of silicon nitride and the penetration ratio of melt.

FIG. 2 illustrates the melt penetration ratio of a refractory containing 5% by weight of graphite. The penetration ratio shows the minimum at 5 to 20% by weight of silicon nitride and increases as the amount of silicon nitride exceeds 20% by weight. The amount of silicon nitride is preferred to be 25% by weight even at the maximum.

Figure 3:
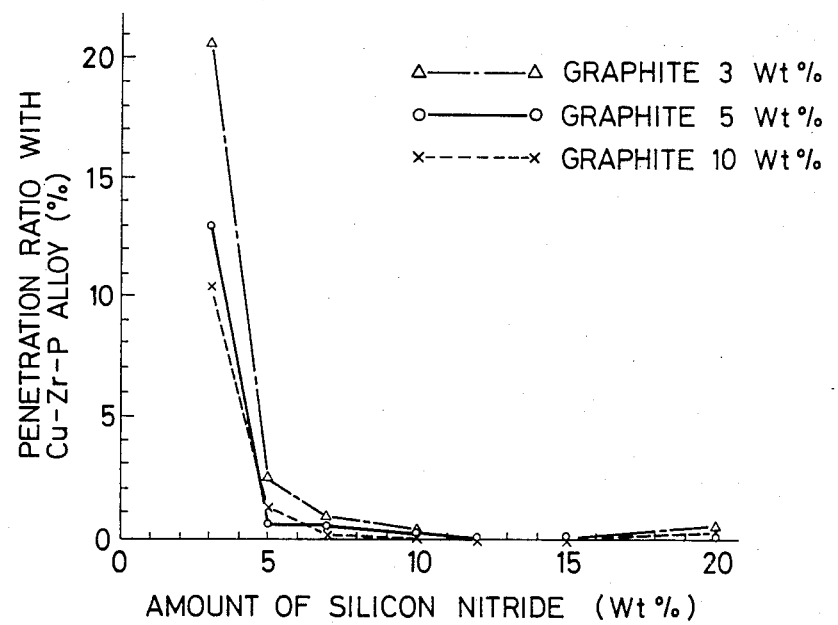

FIG. 3 shows changes in the melt penetration ratio with the amount of silicon nitride, regarding the refractories containing respectively 3, 5, and 10% by weight of graphite. It was confirmed that 5 to 20% by weight of silicon nitride, regardless of the amount of graphite, showed the best effects of preventing the penetration of melt.

Figure 4:
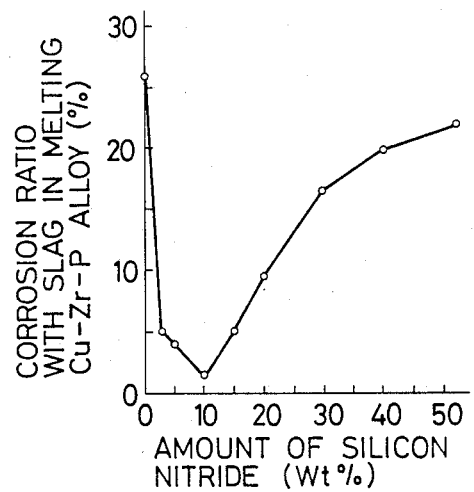
FIGS. 4 and 5 are graphical representations of the relationship between the amount of silicon nitride and corrosion ratio.
Figure 5:
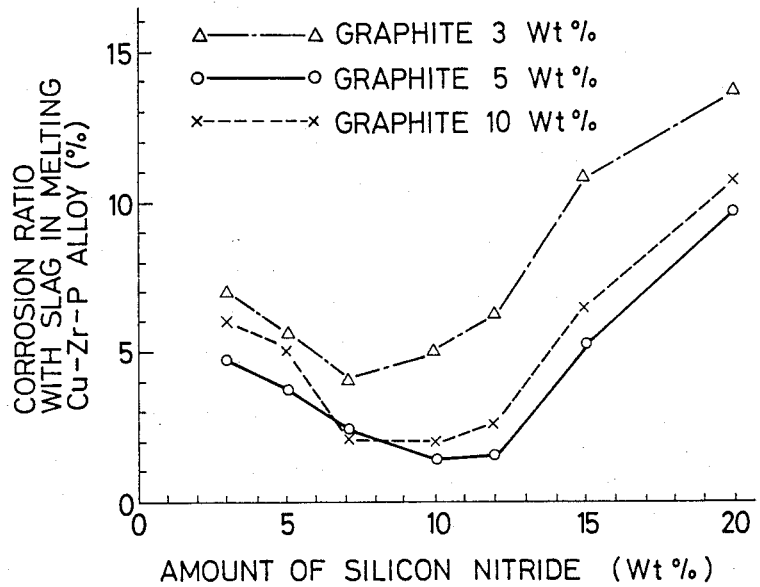

FIG. 4 illustrates the relationship between the amount of silicon nitride and the ratio of corrosion by slag of a refractory containing 5% by weight of graphite. FIG. 5 shows the relationship between the amount of silicon nitride and the ratio of corrosion by slag of refractories containing respectively 3, 5, and 10% by weight of graphite. It is preferred to incorporate in a refractory about 10% by weight, more particularly 7 to 12% by weight of silicon nitride, to prevent corrosion by slag principally comprising CuO.

FIG. 6 illustrates the relationship between the compression strength after the firing of a refractory containing 5% by weight of graphite and the amount of silicon nitride, and FIG. 7 the relationship between the number of shocks repeated in a thermal shock test until cracks appeared in said refractory and the amount of silicon nitride. The samples both had the shape of a round rod of 50 mm $\phi$ in diameter and 50 mm in length. The sample round rods were fired at 1000°, 1200° and 1400° C., among which those fired at 1200° C. were subjected to a thermal shock test. The test was conducted by placing the rod in a heating furnace, maintaining it heated at 1200° C. for 15 minutes, and immersing the rod drawn out of the furnace in water, and repeating these operations. It was found that 7 to 15% by weight of silicon nitride was preferable from the viewpoint of the compression strength and the resistance to thermal shock of the refractory.

(c) CO-generating solid substance

The corrosion of a refractory can be reduced by incorporating a solid substance generating CO in a refractory for use in a furnace as inner lining, because the amount of CuO in the melt of copper-zirconium alloys is decreased, and consequently the amount of the formed slag principally comprising CuO is decreased. As the solid substance forms a gaseous film in between the refractory and the melt, the refractory is prevented from being wetted with the melt.

Graphite is preferably used as said solid substance. As understood from FIG. 8, the preferable amount of the graphite is 3 to 12% by weight, still preferably 5 to 10% by weight.

Figure 8:
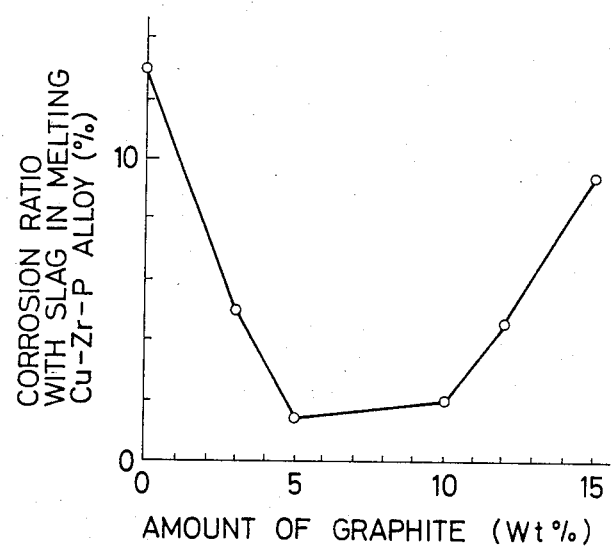
FIG. 8 is a graphical representation of the relationship between the amount of graphite and corrosion ratio.

FIG. 8 illustrates changes in the ratio of corrosion by slag with the amount of graphite, using a refractory crucible containing 10% by weight of silicon nitride and 10% by weight of clay as binder, in which copper-zirconium(0.01% by weight)-phosphorous(0.01% by weight) alloy was molten. The corrosion ratio is clearly increased when the amount of graphite is too small or too much.

Graphite particles smaller than those of 1.2 mm in particle diameter, still preferably a mixture of particles of 1.2 to 0.15 mm and those smaller than 0.15 mm in particle diameter, are used. The amount of the particles smaller than 0.15 mm is within the range of 40 to 80% by weight. As the result of a reaction with the melt, graphite is oxidized and consumed, and the sites where the graphite particles were present will constitute voids. Too many voids decrease the strength of the refractory, and allow the melt to penetrate more easily because of the expansion of the area in contact with the melt.

On the other hand, too small graphite particles are likely to react with atmospheric oxygen and disappear before the reaction with the melt. It is, therefore, preferred to use both of medium and fine particles having a particle diameter of smaller than 1.2 mm, and mix them for application.

Both of earthy graphite and scaly graphite can be used.

(d) Binding agent

High-alumina refractory can be molded without any binding agent because finely divided particles of aggregate serve as a sort of binder. However, a refractory containing a binding agent can be molded more easily, producing a molded product with higher strength.

Inorganic binders such as clay, sodium silicate, or aluminum dihydrogenphosphate, or organic binders such as waste pulp liquor are used, among which the most desirable is clay. It is preferred to use 0.05 to 15% by weight of a binder. Clay such as kaolinite ($Al_2O_3 \cdot 2SiO_2 \cdot 2H_2O$) or montmovillonite ($Al_2O_3 \cdot 4SiO_2 \cdot 6H_2O$) is preferably used in an amount ranging from 7 to 12% by weight. A binding agent comprising sodium silicate, aluminum dihydrogenphosphate, or waste pulp liquor is preferably used in an amount ranging from 0.05 to 5% by weight. Finely divided particles of clay having a particle diameter of smaller than 0.15 mm are preferably used to impart a refractory a sufficient bindability.

(e) Method of using refractory

The refractory of the present invention may be used with or without firing.

When the refractory is used without firing, some water is added to a mixture of particles of refractory components in order to increase the bindability, and the mixture is charged into a predetermined site of a melting furnace and rammed with an air rammer or the like. Otherwise, the mixture may be fitted into the predetermined site of a melting furnace after it was molded into a predetermined shape and dried.

When the refractory is to be fired, a mixture of particles of refractory components are molded into a predetermined shape, dried, and then fired. The firing must be conducted in a reducing atmosphere.

More particularly, the mixture is fired after being sealed in a sheath made of graphite or silicon carbide refractory or in an atmosphere of carbon monoxide with reduced partial pressure of oxygen in the furnace.

The refractory of the present invention is applied to a furnace for melting non-ferrous metals having a melting point of not higher than 1200° C. If the melting furnace made of the refractory of the present invention is used at a temperature of higher than 1200° C., silicon nitride contained in the refractory is rapidly oxidized into silicon dioxide $SiO_2$, which reacts with the melt and rather causes the furnace walls to be peeled and the melt to penetrate. When it is used at a temperature not higher than 1200° C., the improvement in the resistance to thermal shock, the prevention of the reaction with the aluminum melt, and other effects of the incorporation of silicon nitride are exerted without peeling of the furnace walls or other troubles caused by the oxidation of silicon nitride.

Iron can be contained as one of the alloy components in non-ferrous alloys to be molten in a melting furnace made of the refractory of the present invention. It is preferred that the refractory contains 40 to 50% by weight of coarse grains, 15 to 25% by weight of medium grains, and 30 to 45% by weight of fine grains based on the total amount of the refractory.

EXAMPLE

Crucibles and round rods were prepared using 10 types of refractories listed in Table 1. A mixture of electromelting mullite and electromelting corundum was used as high-alumina aggregate. The chemical compositions of the alumina aggregates, silicon nitride, and the clay are shown in Table 2. The particle diameter of the coarse grains of the high-alumina aggregate was within the range of 4.7 to 1.2 mm.

Among the examples of the present invention (Samples No. 1 to No. 9), Samples No. 1 to No. 6 contain clay as binder. Samples No. 7 and No. 8 contain aluminum dihydrogenphosphate as binder. Sample No. 9 contains no binders. Sample No. 10, containing no graphite, is an example of the prior art.

The refractories of Samples No. 7 and No. 8 were prepared by mixing predetermined amounts of raw materials except a binder and thereafter a solution of aluminum dihydrogenphosphate was added and mixed therewith. Therefore, in these examples, "100%" represents the composition of the mixture of essential ingredients except the binder.

The results of the compression strength and thermal shock tests are shown in Table 3, in which "20 times—no peeling" indicates that there were no peeling of the refractory after the thermal shock was repeated 20 times.

TABLE 3

| Sample No. | Compression strength (Kg/cm$^2$) | | | Thermal shock test |
|---|---|---|---|---|
| | Calcination temperature 1000° C. | Calcination temperature 1200° C. | Calcination temperature 1400° C. | |
| 1 | 160 | 220 | 280 | 20 times - no peeling |
| 2 | 180 | 240 | 300 | 20 times - no peeling |
| 3 | 200 | 270 | 320 | 20 times - no peeling |
| 4 | 190 | 280 | 300 | 20 times - no peeling |
| 5 | 220 | 300 | 360 | 20 times - no peeling |
| 6 | 200 | 290 | 340 | 20 times - no peeling |
| 7 | 220 | 280 | 310 | 20 times - no peeling |
| 8 | 200 | 260 | 300 | 20 times - no peeling |
| 9 | 160 | 220 | 260 | 20 times - no peeling |
| 10 | 190 | 320 | 380 | 20 times - no peeling |

The refractories containing clay as binder showed higher compression strength than those containing no clay. The compression strength was scarcely affected by the presence of the graphite.

Copper oxide, copper-zirconium(0.01% by weight) alloy, copper-zirconium (0.01% by weight)-phosphorus (0.01% by weight) alloy, and brass (zinc content: 28% by weight) were molten in the crucibles made of the refractories of Samples No. 1 to No. 10, and the ratios of the corrosion by slag and of the penetration of melts were determined. The results are shown in Table 4. The object of the melting of copper oxide (CuO) was to find how the refractory was corroded by CuO.

TABLE 1

| | Refractory Composition (% by weight) | | | | | | | |
|---|---|---|---|---|---|---|---|---|
| | Alumina aggregate | | | Silicon-nitride | Earthy graphite | | Binder | |
| Sample No. | Coarse grains | Medium grains | Fine grains | Fine grains | Medium grains | Fine grains | Clay Fine grains | Aluminum dihydrogenphosphate |
| 1 | 43 | 17 | 8 | 12 | | 10 | 10 | |
| 2 | 43 | 17 | 8 | 12 | 5 | 5 | 10 | |
| 3 | 46 | 18 | 9 | 12 | | 5 | 10 | |
| 4 | 46 | 18 | 9 | 12 | 2.5 | 2.5 | 10 | |
| 5 | 47 | 19 | 9 | 12 | | 3 | 10 | |
| 6 | 47 | 19 | 9 | 12 | 1.5 | 1.5 | 10 | |
| 7 | 46 | 18 | 19 | 12 | 2.5 | 2.5 | | 0.2 |
| 8 | 46 | 18 | 19 | 12 | | 5 | | 0.1 |
| 9 | 46 | 18 | 19 | 12 | | 5 | | |
| 10 | 49 | 19 | 10 | 12 | | | 10 | |

TABLE 2

| Chemical Composition of Raw Materials (% by weight) | | | | | | |
|---|---|---|---|---|---|---|
| Raw material | SiO$_2$ | Al$_2$O$_3$ | Si$_3$N$_4$ | Fe | CaO + MgO | Others |
| Silicon nitride | — | — | 98.3 | 1.30 | 0.27 | the balance |
| Aggregate | | | | | | |
| Electromelting corundum | 4.06 | 92.40 | — | 2.46 | 1.02 | the balance |
| Electromelting mullite | 18.12 | 78.16 | — | 2.40 | 1.16 | the balance |
| Clay | 44.62 | 39.26 | — | — | 1.24 | the balance |

TABLE 4

| Sample No. | Melting of CuO Corrosion ratio (%) | Melting of Cu—Zr alloy | | Melting of Cu—Zr—P alloy | | Melting of brass | |
|---|---|---|---|---|---|---|---|
| | | Corrosion ratio (%) | Penetration ratio (%) | Corrosion ratio (%) | Penetration ratio (%) | Corrosion ratio (%) | Penetration ratio (%) |
| 1 | 5.6 | 0 | 0 | 2.8 | 0 | 0 | 0 |
| 2 | 2.6 | 0 | 0 | 1.4 | 0 | 0 | 0 |
| 3 | 3.6 | 0 | 0 | 2.8 | 0 | 0 | 0 |
| 4 | 1.2 | 0 | 0 | 1.5 | 0 | 0 | 0 |
| 5 | 6.2 | 1.9 | 0 | 8.0 | 0 | 0 | 0 |
| 6 | 4.5 | 3.4 | 0 | 6.2 | 0 | 0 | 0 |
| 7 | 2.3 | 0 | 0 | 1.8 | 0 | 0 | 0 |
| 8 | 2.4 | 0 | 0 | 2.4 | 0 | 0 | 0 |
| 9 | 2.4 | 0 | 0 | 2.0 | 0 | 0 | 0 |
| 10 | 28.0 | 17.9 | 0 | 24.1 | 0 | 22.5 | 0 |

As understood from the results of Sample No. 1, the corrosion ratio of the refractory containing no graphite is high. The corrosion ratio can be remarkably reduced by the incorporation of graphite, resulting in the elongation of the service life of the refractory.

The corrosion ratio was scarcely affected by the presence of the binders.

As understood from the foregoing description, the refractory of the present invention has an advantage of being difficultly corroded by the slag formed when copper alloys are molten.

What is claimed is:

1. A high-alumina refractory for use in a non-ferrous metal melting furnace consisting of a mixture of 5 to 25% by weight of silicon nitride particles, 3 to 12% by weight of graphite particles which generate carbon monoxide by reaction with the melt of said non-ferrous metals and a balance of high-alumina aggregate particles containing at least 60% by weight of aluminum oxide; said high-alumina aggregate particles comprising coarse grains having a particle diameter of at least 1.2 mm, medium grains having a particle diameter ranging from 0.15 to 1.2 mm and fine grains having a particle diameter of smaller than 0.15 mm.

2. A high-alumina refractory for use in a nonferrous metal melting furnace, according to claim 1, wherein said high-alumina aggregate particles comprise 40 to 70% by weight of said coarse grains, 10 to 30% by weight of said medium grains, and 10 to 40% by weight of said fine grains.

3. A high-alumina refractory for use in a nonferrous metal melting furnace according to claim 1, wherein said silicon nitride comprises $Si_3N_4$.

4. A high-alumina refractory for use in a nonferrous metal melting furnace according to claim 1, wherein said silicon nitride comprises at least 80% by weight of particles having a particle diameter of smaller than 0.15 mm.

5. A high-alumina refractory for use in a non-ferrous metal melting furnace according to claim 1, which contains 7 to 15% by weight of the silicon nitride.

6. A high-alumina refractory for use in a non-ferrous metal melting furnace according to claim 1, wherein said graphite comprises particles having a particle diameter of smaller than 1.2 mm.

7. A high-alumina refractory for use in a non-ferrous metal melting furnace according to claim 9, wherein said graphite comprises 40 to 80% by weight of particles having a particle diameter of smaller than 0.15 mm.

8. A high-alumina refractory for use in a non-ferrous metal melting furnace according to claim 1, which contains 5 to 10% by weight of said graphite.

9. A high-alumina refractory for use in a non-ferrous metal melting furnace consisting of a mixture of 5 to 25% of silicon nitride particles, 3 to 12% by weight of graphite particles which generate carbon monoxide by reaction with the melt of said non-ferrous metals, 7 to 12% by weight of clay as a binding agent and a balance of high-alumina aggregate particles containing at least 60% by weight of aluminum oxide; said high-alumina aggregate particles comprising coarse grains having a particle diameter of at least 1.2 mm, medium grains having a particle diameter ranging from 0.15 to 1.2 mm and fine grains having a particle diameter of smaller than 0.15 mm.

10. A high-alumina refractory for use in a non-ferrous metal melting furnace accoring to claim 9, wherein the clay comprises particles having a particle diameter of smaller than 0.15 mm.

11. A high-alumina refractory for use in a non-ferrous metal melting furnace according to claim 9, which contains 5 to 10% by weight of the graphite.

* * * * *